UNITED STATES PATENT OFFICE.

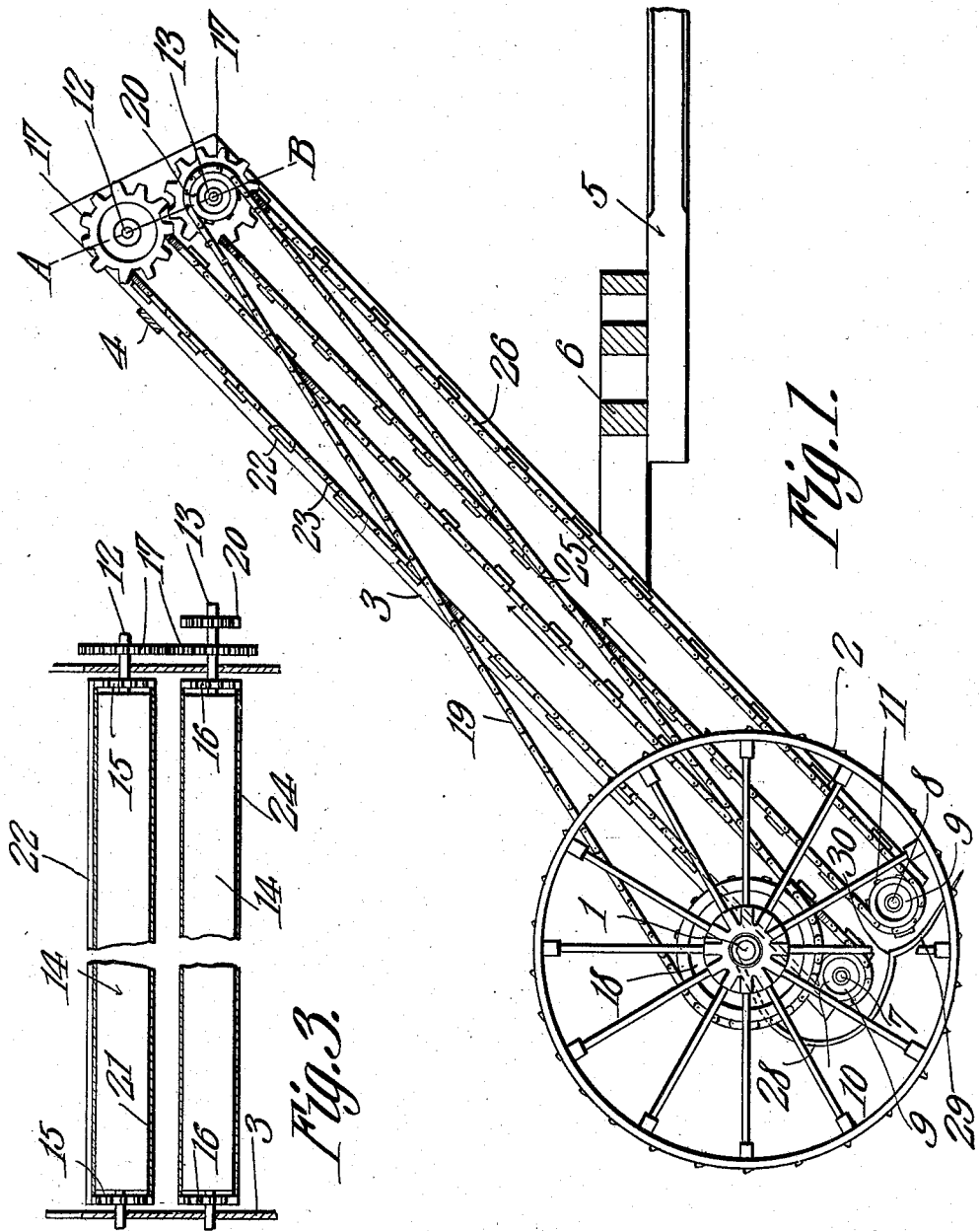

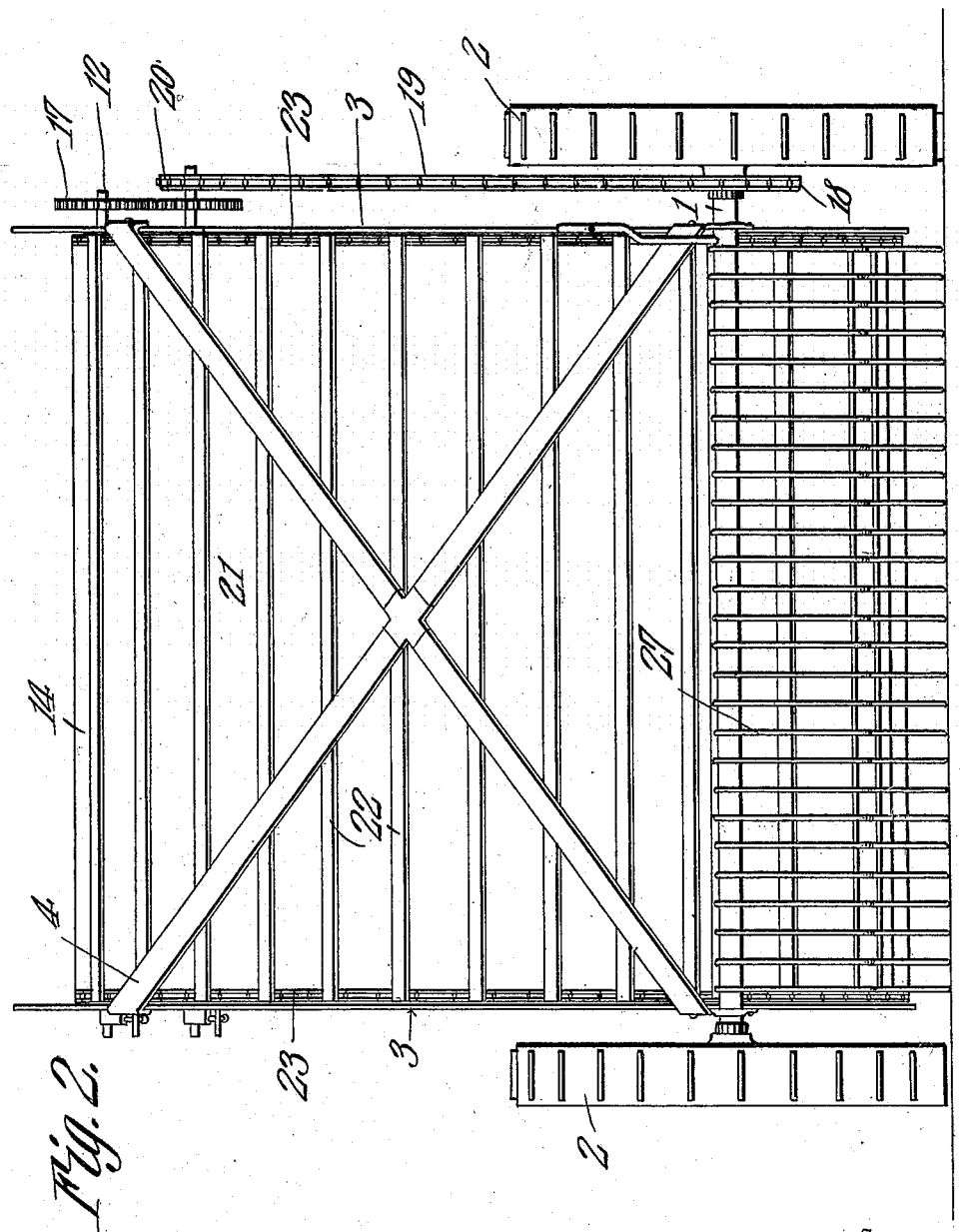

CHARLES BORNHOLDT, OF AVOCA, IOWA.

HAY RAKE AND LOADER.

No. 924,035.　　　　Specification of Letters Patent.　　　　Patented June 8, 1909.

Application filed October 8, 1908. Serial No. 456,831.

*To all whom it may concern:*

Be it known that I, CHARLES BORNHOLDT, a citizen of the United States, residing at Avoca, in the county of Pottawattamie and State of Iowa, have invented a new and useful Hay Rake and Loader, of which the following is a specification.

This invention relates to hay rakes and loaders and more particularly to devices of this type designed to be drawn over the field and to collect the hay and elevate it to a point from which it can be readily discharged into a receptacle provided therefor.

A further object is to provide a machine of this character which will securely hold the hay while being elevated so as to prevent it from being blown out of position.

A still further object is to provide an elevator made up of a pair of aprons so disposed relatively to each other as to prevent the material being elevated from clogging the machine and interfering with the operation thereof.

Another object is to provide a novel arrangement of rake teeth or tines which results in positively directing the collected material into proper position within the elevating mechanism.

With these and other objects in view the invention consists of certain novel details of construction and combinations of parts hereinafter more fully described and pointed out in the claim.

In the accompanying drawings the preferred form of the invention has been shown.

In said drawings:—Figure 1 is a side elevation of the machine, one of the sides of the frame of the machine being removed to show the interior mechanism in elevation and the connection between the body of the machine and the tongue being shown in section. Fig. 2 is a rear elevation of the machine. Fig. 3 is a section on line A—B Fig. 1.

Referring to the figures by characters of reference 1 designates the axle of the machine, the same being supported by wheels 2 and having parallel upwardly and forwardly inclined side strips 3 supported from the axle and connected at their upper edges by suitable braces 4, which, in the present instance, have been shown crossed as indicated in Fig. 2. The lower portions of the side strips 3 are attached to the tongue 5 in any suitable manner as by means of hounds or in any other desired manner. The side strips 3 constitute the side walls of the body of the machine and journaled within the lower portions of these strips are upper and lower shafts 7 and 8 respectively, the shaft 7 being disposed in a vertical plane extending back of the shaft 8. Each of these shafts has a roller 9 thereon and a sprocket 10 is secured to each end portion of the shaft 7 while sprockets 11 are secured to the end portions of the shaft 8.

Upper and lower shafts 12 and 13 respectively are journaled in the upper portion of the body of the machine, the upper shaft 12 being disposed in a vertical plane extending back of the shaft 13. Each of these shafts has a roller 14 secured thereto. Sprockets 15 are secured to the shaft 12 adjacent each of the side strips 3, while sprockets 16 are similarly located upon the shaft 13. Gears 17 are secured to one end of the shafts 12 and 13 and constantly mesh so that when one of the shafts is rotated these gears will transmit motion therefrom to the other shaft. A drive sprocket 18 is secured to one of the wheels 2 and motion is designed to be transmitted therefrom through a chain 19 to a sprocket 20 secured on the shaft 13.

An endless conveyer apron 21 extends around the upper rollers 9 and 14 and is provided with transversely extending slats 22, the end portions of which project beyond the edges of the apron and are secured to chains 23 carried by the sprockets 10 and 15. Another endless apron 24 is carried by the rollers 9 and 14 on shafts 8 and 13 and this apron is also provided with transversely extending slats 25, the end portions of which extend beyond the edges of the apron and are secured to chains 26 carried by the sprockets 11 and 16.

By referring to Fig. 1 it will be noted that the axle 1 is disposed almost directly over the shaft 7. This constitutes a support for a series of rake teeth or tines 27, said series extending throughout the width of the aprons 21 and 24. As shown in Fig. 1 each tine is formed of an upper arcuate portion 28 which curves over and back of the shaft 7 and in between said shaft and the shaft 8, the lower end of said arcuate portion being provided with a bowed extension 29 which curves back of the shaft 8 and extends there-below so that the point of the tooth will engage material upon the ground. This lower portion 29 of the tooth is straight for a considerable portion of its length so that the material engaged thereby will be free to slide upwardly therealong and into engagement with the slats on the lower apron.

The machine herein described is designed to be drawn over a field by horses and the rotation of one of the wheels 2 will result in the actuation of chain 19 which operates to rotate the sprocket 20. The two aprons are thus set in motion by means of the mechanism shown and described, the inner or adjoining plies of the aprons moving upwardly in the same direction as indicated by arrows in Fig. 1. The lower terminals of the teeth of the fork will gather the loose hay or straw and the material will slide upwardly on the lower portions 29 of the teeth and be directed thereby into the path of the slats 25 carried by the lower apron. The inwardly directed intermediate portions of the teeth, and which have been indicated at 30, serve to positively prevent any of this material from passing around the lower end of the upper apron 21 so as to pile thereon and interfere with the operation of the parts. After the material has been elevated by the rake teeth into position between the lower portions of the aprons, it is engaged by the slats of the adjoining plies of the two aprons and carried upwardly between said aprons and between the side strips 3. It will be apparent therefore that the material cannot be dislodged by wind or by objects striking the machine. The material is carried upwardly by the belt and discharged from between the upper portions thereof.

Importance is attached to the fact that the rollers located at the lower end of the machine and those located at the upper end of the machine are both disposed out of vertical alinement and are also disposed outside of a plane extending perpendicularly to the direction of movement of the material within the machine. As a result of this construction the material passes successively across the rollers and is not compelled to pass through an unyielding space, such as ordinarily would be produced should the rollers be disposed in a plane perpendicular to the line of movement of the material. In other words, while the material is passing over the roller 14 arranged on the shaft 13 the lower ply of the upper apron 21 is free to yield upwardly should this be necessary, and, therefore, there is no danger of the material packing between the rollers.

It will be seen that the machine is very light as well as durable and simple in construction and is advantageous not only because it efficiently collects and elevates the material, but also because it prevents the material from being thrown out of the machine should the hay or straw be gathered during a high wind.

It is to be understood of course that various changes may be made in the construction and arrangement of parts without departing from the spirit or sacrificing the advantages of the invention.

What is claimed is:—

A combined hay-rake and loader comprising a wheel-supported axle, an upwardly and forwardly inclined frame mounted upon the axle, said frame extending under the axle, upper and lower endless conveyers mounted in and extending longitudinally of the frame, the adjoining plies of the two conveyers being parallel, upper and lower revoluble devices supporting each conveyer and carried by the frame, means for transmitting rotary motion from one of the supporting wheels to one of the upper revoluble devices, said means being separate from the conveyers, meshing gears revoluble with the upper conveyer-supporting devices for positively transmitting rotary motion from one of said devices to the other, a series of teeth secured to the axle and extending below and across the lower portions of the conveyers, said teeth having intermediate portions extending between the lower portions of the conveyers, said power-transmitting devices constituting means for maintaining the adjoining parallel plies of the conveyers normally taut, and a draft tongue extending from the inclined frame.

In testimony that I claim the foregoing as my own, I have hereto affixed my signature in the presence of two witnesses.

CHARLES BORNHOLDT.

Witnesses:
FRED TIESSEN,
JOHN MARKS.